US009428006B2

(12) United States Patent
Martin et al.

(10) Patent No.: US 9,428,006 B2
(45) Date of Patent: Aug. 30, 2016

(54) COMPOSITE WHEEL, IN PARTICULAR FOR A CYCLE, AND METHOD FOR MANUFACTURING SUCH A WHEEL

(75) Inventors: Pierre-Jean Martin, Loriol-sur-Drome (FR); Thomas Dupont, Loriol-sur-Drome (FR)

(73) Assignee: CORIMA, Loriol-sur-Drome (FR)

( * ) Notice: Subject to any disclaimer, the term of this patent is extended or adjusted under 35 U.S.C. 154(b) by 1001 days.

(21) Appl. No.: 13/509,651

(22) PCT Filed: Nov. 17, 2010

(86) PCT No.: PCT/FR2010/052436
§ 371 (c)(1),
(2), (4) Date: Sep. 12, 2012

(87) PCT Pub. No.: WO2011/064485
PCT Pub. Date: Jun. 3, 2011

(65) Prior Publication Data
US 2013/0009453 A1    Jan. 10, 2013

(30) Foreign Application Priority Data
Nov. 25, 2009   (FR) .................................... 09 58346

(51) Int. Cl.
*B60B 1/14*        (2006.01)
*B60B 5/02*        (2006.01)
*B60B 1/02*        (2006.01)
(Continued)

(52) U.S. Cl.
CPC ............... *B60B 5/02* (2013.01); *B60B 1/0223* (2013.01); *B60B 1/041* (2013.01); *B60B 1/042* (2013.01); *B60B 21/025* (2013.01); *B60B 21/062* (2013.01); *B60B 27/023* (2013.01)

(58) Field of Classification Search
CPC . B60B 1/0276; B60B 1/0261; B60B 1/0269; B60B 1/0292; B60B 1/04; B60B 1/041; B60B 1/042; B60B 1/043
USPC .................................. 301/55, 58, 59, 61, 104
See application file for complete search history.

(56) References Cited

U.S. PATENT DOCUMENTS 644,968 A    3/1900   Crawford et al.
705,121 A    7/1902   Newton
(Continued)

FOREIGN PATENT DOCUMENTS

CN    2772852       4/2006
DE    32 25 565    1/1984
(Continued)

OTHER PUBLICATIONS

Mark Ewers, Two Wheel Blogs, "The World's Strongest and Lightest Wheels", Nov. 29, 2006, <http://www.twowheelblogs.com/2-old-2-go-slow/the-worlds-strongest-and-lightest-wheels>.
(Continued)

*Primary Examiner* — S. Joseph Morano
*Assistant Examiner* — Jean Charleston
(74) *Attorney, Agent, or Firm* — Clark & Brody

(57) ABSTRACT

A wheel, (1) particularly for a cycle, includes a circular rim (2), a hub (3) concentric with the rim, and spokes (4) connecting the hub (3) to the rim (2). The rim, the hub, and the spokes are made of a polymerized composite material. The spokes (4) are paired two by two on either side of the bond plane of the wheel and are attached without tension at their ends onto the hub (3) and onto the rim (2).

15 Claims, 3 Drawing Sheets

Figure 1:
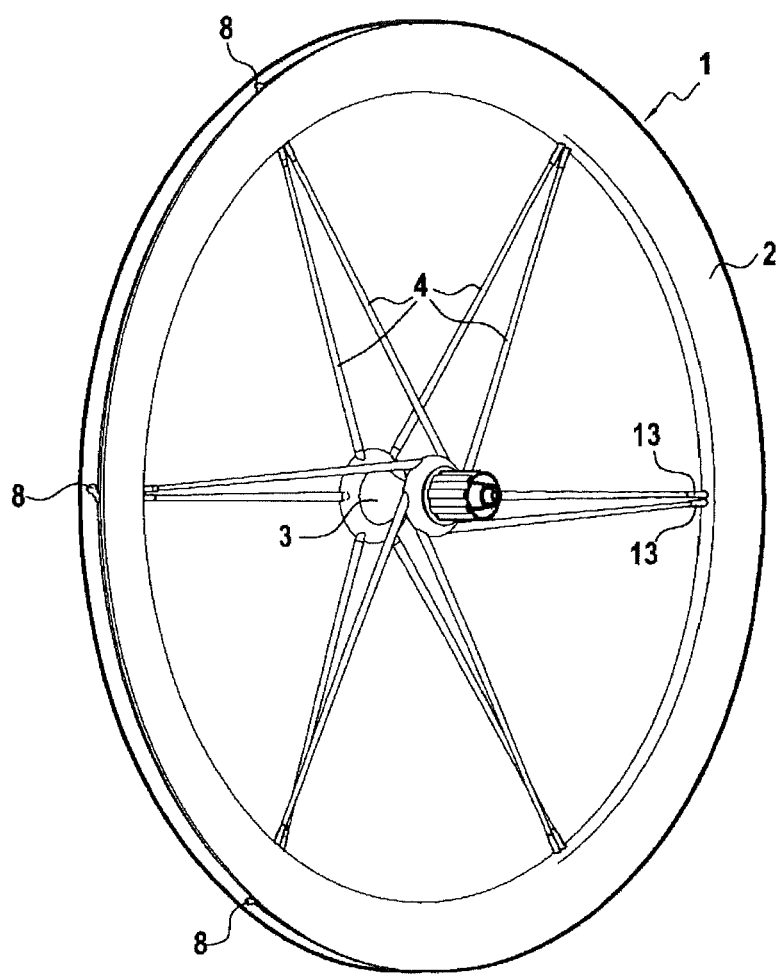

(51) Int. Cl.
  *B60B 1/04* (2006.01)
  *B60B 21/02* (2006.01)
  *B60B 21/06* (2006.01)
  *B60B 27/02* (2006.01)

(56) References Cited

U.S. PATENT DOCUMENTS

| | | | |
|---|---|---|---|
| 802,118 A | 10/1905 | Schoche | |
| 1,433,435 A | 10/1922 | Van Horn | |
| 4,226,479 A | 10/1980 | Weld | |
| 4,729,605 A | 3/1988 | Imao et al. | |
| 4,919,490 A | 4/1990 | Hopkins et al. | |
| 5,246,275 A | 9/1993 | Arredondo | |
| 5,779,323 A | 7/1998 | Burrows | |
| 5,806,935 A | 9/1998 | Shermeister | |
| 5,915,796 A | 6/1999 | Beyer | |
| 6,145,938 A * | 11/2000 | Dietrich | B60B 1/003 301/110.5 |
| 6,679,563 B2 * | 1/2004 | Okajima | B60B 1/0215 301/58 |
| 2003/0090141 A1* | 5/2003 | Dietrich | B60B 1/0269 301/58 |
| 2004/0195908 A1 | 10/2004 | Main | |
| 2005/0062337 A1* | 3/2005 | Meggiolan | B29C 70/446 301/95.102 |
| 2005/0253446 A1* | 11/2005 | Okajima | B60B 1/0284 301/58 |
| 2006/0170277 A1* | 8/2006 | Passarotto | B60B 1/0261 301/59 |
| 2008/0191543 A1* | 8/2008 | Saillet et al. | 301/55 |
| 2008/0191548 A1* | 8/2008 | Bond | B60T 8/4275 303/115.1 |
| 2009/0160243 A1* | 6/2009 | Mercat | B60B 1/003 301/75 |
| 2010/0301663 A1* | 12/2010 | Kismarton | B60B 5/02 301/64.704 |

FOREIGN PATENT DOCUMENTS

| | | | |
|---|---|---|---|
| DE | 201 13 722 | 8/2001 | |
| DE | 10 2007 036065 | 2/2008 | |
| DE | 10 2008 007722 | 8/2008 | |
| EP | 0 916 520 | 3/2004 | |
| EP | 1 016 553 | 7/2005 | |
| EP | 1 759 880 | 3/2007 | |
| EP | 1 764 233 | 3/2007 | |
| EP | 1 800 897 | 6/2007 | |
| EP | 1 985 434 | 10/2008 | |
| EP | 1 759 880 | 12/2009 | |
| FR | 2 924 380 | 6/2009 | |
| FR | 2 933 030 | 1/2010 | |
| FR | 002933030 A1 * | 1/2010 | B60B 5/02 |
| GB | 395 | 0/1897 | |
| GB | 18893 | 9/1899 | |
| GB | 12449 | 6/1901 | |
| GB | 12743 | 6/1903 | |
| GB | 18058 | 12/1915 | |
| GB | 250 059 | 6/1925 | |
| GB | 2 368 320 | 5/2002 | |
| IT | VI930085 | 11/1994 | |
| WO | 00/35683 | 6/2000 | |
| WO | 03/020535 | 3/2003 | |
| WO | 2004/101294 | 11/2004 | |

OTHER PUBLICATIONS

Roues Artisanales, Feb. 12, 2007, http://www.rouesartisanales.com/article-5626666.html.

Lennard Zinn, Velo News, "Tech Report, with Lennard Zinn—Hot Wheels", published Mar. 13, 2007, http://velonews.competitor.com/2007/03/bikes-and-tech/tech-report-with-lennard-zinn-hot-wheels_11883.

Bicycle News Wire, "Lew Racing", Apr. 18, 2007, http://www.bicyclenewswire.com/index.cfm?fuseaction=home.showrelease&cid=1588,id=467.

<GIPIEMME> Catalog of 1995.

* cited by examiner

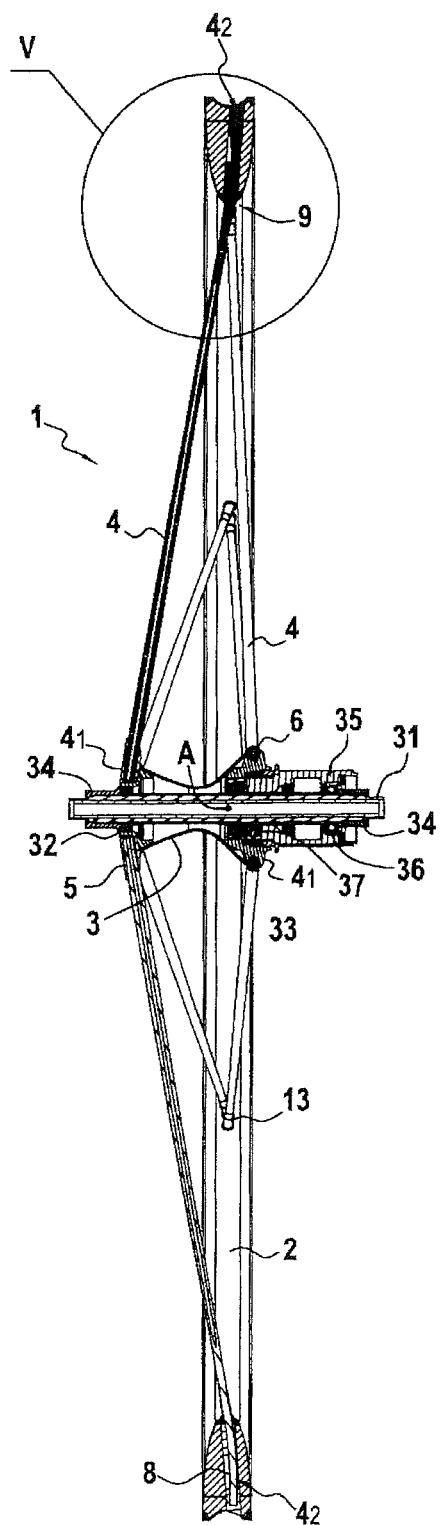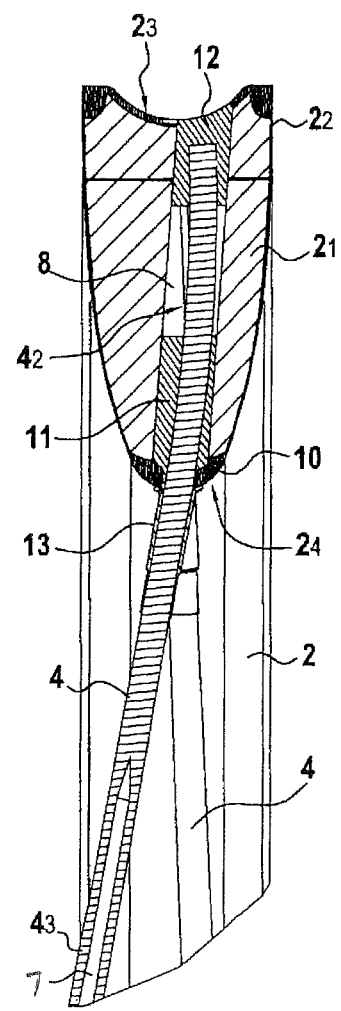
FIG.2
FIG.5

COMPOSITE WHEEL, IN PARTICULAR FOR A CYCLE, AND METHOD FOR MANUFACTURING SUCH A WHEEL

The present invention relates to the field of design and manufacture of equipment made of high-performance composite materials for sporting use, and more particularly for use in cycling.

The invention relates more particularly to a new bicycle wheel of which the rim, the spokes and the hub body are made of composite, particularly carbon-fiber based, material.

In the field of cycling, improvement in the performance of the contestants, professional or amateur, is essentially linked to technical improvement in the materials used. This technical improvement in the materials depends primarily on gains achieved in the mass of each component of the bicycles, their stiffness and their aerodynamic qualities.

As regards the wheels of the bicycles, the principal performance criteria are high stiffness, low mass and low rotational inertia.

The stiffness and mass parameters have for many years been improved by the use of carbon-fiber-based composite, particularly for making the rims and the wheel hubs.

Until recently, the spokes of the wheels were, for their part, always made of metal. To increase the stiffness of wheels equipped with such spokes, the latter are often preloaded in tension, the preloading tensions reaching up to 1800 Newtons. However, the application of such forces to the spokes then requires reinforcement of the material thickness on the edge of the rim where the spokes are attached, which works against the objectives of reducing the mass of the rim, and hence of the wheel.

Quite recently, a certain number of cycling equipment manufacturers have developed wheels with rims made of composite material associated with spokes also made of composite material to which much lower spoke tensions are applied, allowing very stiff wheels to be obtained.

The reduction of spoke tensions is advantageous because the dimensioning of the rim and of the hub, particularly as regards thicknesses of materials, can be reduced, which allows the weight of the wheel to be reduced and a considerable improvement in rotational inertia to be obtained.

There currently exist two principal methods for assembling spokes made of composite material to a rim and a hub also made of a single material, composite or metal:
- overmolding, co-molding or adhesive bonding spokes into the rim and the hub,
- attachment of individually fabricated spokes onto the rim and the hub with mechanical parts (spoke head, threaded elements).

The technique of overmolding, of co-molding or adhesive bonding is advantageous because it makes it possible to obtain a mechanical connection of the spokes to the rim and the wheel hub that is lightweight, rigid and strong.

The technique for attaching spokes made of composite material with metal mechanical parts makes it possible to obtain a removable and adjustable attachment, but the total weight of the wheel is greater. In addition, mechanical problems of fatigue and differential expansion can occur over time at the metal-composite material connection.

One technical variation has also been proposed in document FR 2933 030 for making spokes for a bike wheel by lacing followed by polymerization. However, this technique proves to be very complicated to implement and the reliability of the wheels remains questionable.

The present invention has as its object to propose a new type of cycle wheel comprising a rim, a hub and spokes made of composite material, particularly carbon-fiber based, the mass, stiffness and rotational inertia whereof are optimized and the manufacture whereof is simple, fast and reliable.

Another aim of the invention is to propose a manufacturing method for a cycle wheel consisting solely of elements made of composite material, which is simple and reliable to implement.

Thus, according to a first object, the present invention proposes a wheel, particularly for a cycle, comprising a circular rim, a hub concentric with the rim, and spokes connecting said hub with said rim, said spokes consisting of a composite material, characterized in that the spokes are paired two by two on either side of the median plane of the wheel and are attached by their ends, without applying tension, at the hub and at the rim.

The wheel of the present invention has the advantage of having spokes made of composite material bonded to the rim and the hub at their ends and free of tension. Such a wheel has very high stiffness as well as a very low mass leading to low rotational inertia compared with traditional composite wheels. In addition, the structure with spokes paired two by two with respect to the median plane of the wheel allows a considerable reduction in the number of spokes needed to obtain satisfactory stiffness of the wheel; in practice the number of spokes can thus be reduced to 12 spokes, six for each umbrella structure of the wheel, which also makes it possible to considerably reduce the total mass of the wheel, thus making it possible to obtain a pair of front and rear wheels with a total mass on the order of 1 kg.

In conformity with a first preferred feature of the invention, the rim and the hub of the wheel consist essentially, but not necessarily exclusively, of a composite material comprising carbon fibers impregnated with a thermosetting binder, an epoxy resin for example. Such a material exhibits the advantage of imparting very high compressive and tensile strength, very high stiffness and very low mass.

In conformity with one advantageous feature, the spokes have variable thickness over their entire length between the hub and the rim. In particular, the spokes have a substantially conical or frusto-conical longitudinal section with material thickness decreasing from the hub toward the rim.

Preferably, in order to retain good geometric stability and good strength in compression and tension, the spokes are adhesive bonded by a thermosetting resin at their ends to the hub and into the rim in recesses provided for this purpose.

Still according to the invention and with the aim of reinforcing the compressive and tensile strength of the pairs of spokes, the rim exhibits, in the spoke insertion area near the trailing edge, a thickness reinforcement.

In one particular embodiment of the wheel of the invention, the spokes have a bent end for insertion into the rim. Such a bent end proves to be particularly advantageous when the wheel rim is a profiled rim.

Still advantageously, the wheel proposed by the invention includes stops for blocking the spokes at the ends for insertion of said spokes into the rim. These stops are advantageously stops internal and external to the rim, located on either side of the trailing edge of the rim so as to effectively block the spokes within the rim.

In addition, the blocking stops are advantageously constituted of composite material.

Also advantageously, the paired spokes are bonded two by two at their rim insertion ends by a thermosetting resin.

Still according to the invention, the spokes are bonded and oriented at the hub end to flanges bonded to the hub along radial directions of the wheel, perpendicular to the hub axis.

Such a structure imparts balance and stiffness to the wheel and contributes to the good rotational inertia of the wheel.

Further, if the wheel is a rear wheel, it is advisable that the spokes be able to transmit the hub torque and in this case certain spokes at least, preferably spokes in the same wheel umbrella, are bonded and oriented onto a hub flange in a direction tangent to said hub flange.

According to a second object, the invention also proposes a manufacturing method for a wheel such as that presented above, this method consisting essentially of the following steps:

a) installation of a wheel rim and hub consisting of polymerizable material onto a jig, b) insertion of the ends of the spokes, paired two by two, into recesses made for this purpose in the hub and in the rim, c) injection of a thermosetting binder into the recesses for insertion of the ends of the spokes, and d) connection of the spokes to the rim and to the hub by polymerization in an autoclave.

Various other features appear from the description given below with reference to the appended drawings which show, by way of non-limiting examples, embodiments of the object of the invention.

Figure 3:
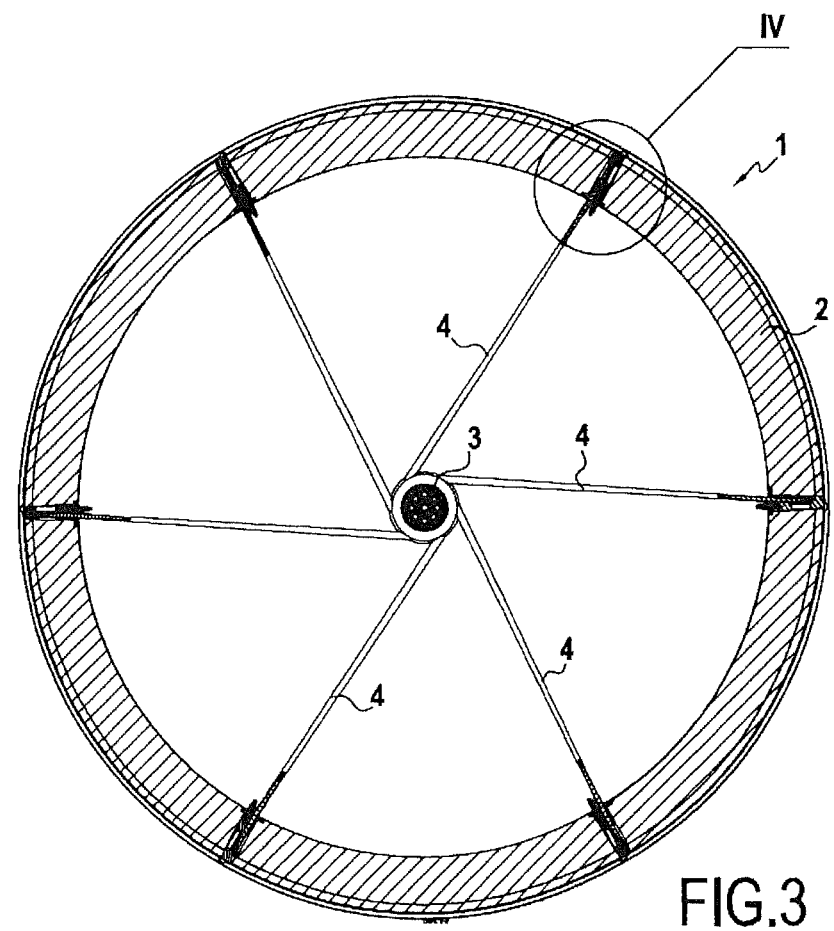
Figure 4:
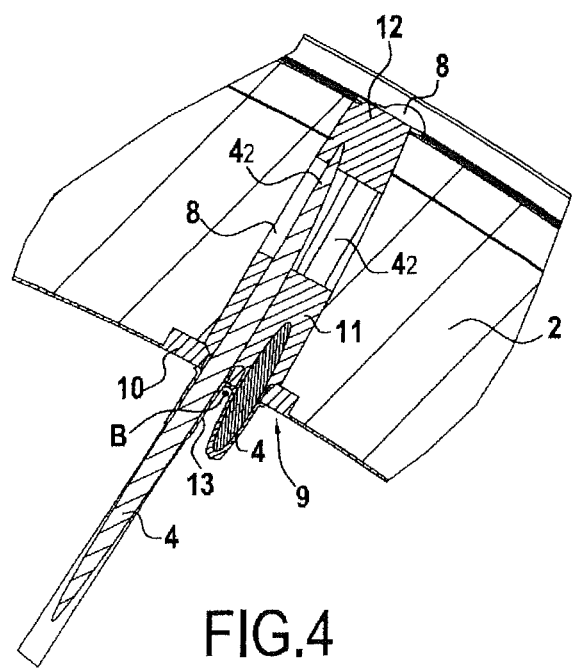

In the figures:

FIG. 1 shows in perspective a rear wheel conforming to the present invention;

FIG. 2 shows a section view of the wheel of FIG. 1 in a transverse plane containing the hub axis, FIG. 3 shows a median section view of the wheel of FIG. 1 in the bond plane of the rim, perpendicular to the hub axis, FIG. 4 shows a detail of the connection of two spokes within the rim as shown in FIG. 3, FIG. 5 shows a detail of FIG. 2 showing the insertion and blocking of a spoke inside and outside the wheel rim.

FIG. 1 shows a cycle wheel 1 conforming to the present invention in a preferred embodiment. It includes, conventionally, an profiled rim 2 designed to support on its periphery an innertube or a road tire (not shown), a hub 3 located concentrically with the rim 2 and which is designed to allow the attachment and the rotation of the wheel 1 in a bike frame, and spokes 4 connecting the inner section of the rim 2 to the hub 3.

As shown in FIGS. 2 and 5, the rim 2 preferably consists, in a fashion known per se, of a structural foam core $2_1$ covered with a facing of composite material $2_2$ made up of carbon-fiber plies impregnated with epoxy resin.

As for the hub 3, as shown in FIG. 2, it comprises a central axle 31, traditionally consisting of aluminum, at the ends whereof are mounted two ball bearings 32, 33 blocked in translation on the axle 31 between two end flanges 5, 6 and assembly nuts 34 coaxial with the axle 31 near the ends of said axle 31. The hub 3 includes in the example shown a freehub body 35 coaxial with the axle 31 of the hub for supporting the chain sprockets enabling propulsion of the bike. The freehub body 35 is embedded in the flange 6 and is movable in rotation on the axle 31 and with respect to the flange 6 by a ball bearing 36 and a freewheel system 37, using a pawl and ratchet for example. At the end of the axle 31, the freehub body 35 is held in translation by an assembly nut 34. The main body of the hub 3 between the flanges 5, 6 consists of a facing 37 made up of carbon-fiber plies pre-impregnated with epoxy resin and which imparts to the hub 3 extreme stiffness and strength, particularly in torsion, buckling and shear.

The wheel 1 shown in FIGS. 1 through 3 is the rear wheel of a bike. However, it is advisable to note here that a front wheel would be perfectly identical in form except at the hub 3, which would then be without a freehub body coaxial with the axle 31.

In conformity with the invention, the wheel 1 includes composite spokes 4, consisting in this particular case of carbon fibers impregnated with epoxy resin, not tensioned between the rim 2 and the hub 3. In original fashion, the spokes 4 are in fact simply bonded to the hub 3 and to the rim 2 by adhesive bonding using a thermosetting binder, for example an epoxy cement or resin, possibly reinforced with glass fibers, without tensioning.

Advantageously, the spokes 4 are conical in shape and have variable thickness, preferably decreasing from their first end $4_1$, attached to the hub 3, to their second end $4_2$ inserted and bonded into the rim 2. Such a conical shape contributes to good stiffness in the wheel 1, and better resistance of the spokes 4 to buckling forces. Each conical spoke 4 is manufactured as a single unit based on carbon-fiber plies.

In order to provide for the strength of the spoke, the fibers used to make the spokes 4 are not all aligned with the axis of the 4 but are instead crossed. Thus, in the event that the spokes 4 are loaded in torsion or in shear, loads placed solely on the epoxy resin that binds the carbon-fiber plies employed together are prevented.

What is more, in conformity with an advantageous feature of the invention, each spoke 4 is built around a core 7 of polymer material, which facilitates the placement of the carbon fibers and is designed to ensure cohesion of the complete spoke 4. To this end, the polymer core 7 is advantageously selected to be polyamide. Indeed, this material is shock resistant which makes it possible, when an impact on the spoke 4 occurs that brings about a tear in the carbon composite facing $4_3$, to avoid breakage of the spoke and to preserve its integrity through connection of the core 7 to the fragments of composite skin $4_3$.

On each wheel 1, the spokes 4 are preferably twelve in number, paired and bonded two by two at their narrow ends $4_2$ in the rim 2.

For the front wheel, the paired spokes are then symmetrical, two by two, with respect to a line running through the intersection A of the median plane of the wheel with the axis of the wheel and the point B on the trailing edge that is equidistant from each paired spoke. Thus paired, the pairs of spokes 4 of the wheel 1 of the invention constitute the equivalent of rigid wheel spokes, which impart a very great stiffness to it.

The rim 2 of the wheel of the invention includes, to allow attachment of the spokes 4 paired two by two, openings or recesses 8 drilled into the height of the rim from the circumferential band $2_3$ of the rim to a reinforcement 10 in the trailing edge area 9 of the rim. These reinforcements 10 consist for example of an extra thickness of carbon for reinforcing the rim 2 in tension and compression. These openings 8 are drilled in the rim 2 at a slight inclination with respect to the median plane of said rim in order to be able to insert, during manufacture, the narrow end $4_2$ of the spokes 4 into the rim 2 while respecting the desired umbrella angle (spreading angle of the spoke between the rim and the hub) for attachment of the other end $4_1$ of the spoke to the hub 3.

In practice, the bored angles of the openings 8 are substantially equal to the angles of the spoke 4 axes with respect to the axis of the wheel hub 3. Finally, the bored diameter of the openings 8 is chosen such that it allows the insertion into the rim of the ends $4_2$ of the paired spokes 4 as well as the injection, after placement of the spokes, of two resin plugs 11, 12 designed to bond the ends $4_2$ of the spokes 4 together inside the rim 2 and said ends to the rim itself, the plug 11 constituting an internal stop for blocking the spokes 4 in the rim 2, while the plug 12 constitutes an anchorage for the ends $4_2$ of the spokes on the circumferential band $2_3$ of the rim 2.

The rim 2 of the wheel 1 of the present invention has a conventional rim or, as shown in FIGS. 1 through 5, an profiled rim. Such anprofiled rim traditionally exhibits a greater rim height than conventional rims, in practice a height on the order of 4 to 8 cm in general. Such a rim height is intended to improve the aerodynamic qualities of the wheels. Within the scope of the invention, however, such a height proves to be problematic. Indeed, with this type of "high profile" rim, the angle formed between a spoke 4 and the median plane of the rim is greater than the maximum included angle between the axis of the opening 8 which can be made in the rim 2 and the median plane of the rim. Thus, a straight spoke 4 can not pass completely through the rim 2.

To resolve this problem, the invention proposes advantageously to use, as is revealed in FIGS. 2 and 5 particularly, a spoke 4 with an end $4_2$ that is not straight, and is in practice bent, which compensates for the difference in inclination angle between the axis of the spoke 4 on its main straight portion and the bore axis of the opening 8 in the profiled rim. The bent portion of the spoke is then located substantially in the middle of the spoke assembly opening 8 in the rim, so as not to create a load concentration at the spoke-rim transition when the spoke 4 is subjected to loads.

This bent end $4_2$ of a spoke 4 also allows attenuation of the loads on the spoke bonded to the rim 2 because it is no longer situated on the principal axis of the spoke between the rim 2 and the hub 3.

Finally, regardless of the type of rim 2, the wheel 1 of the invention also includes external stops 13 for blocking the ends of the spokes 4 on the rim 2. These stops 13, made of composite materials, are advantageously overmolded onto the spokes 4 at their junction with the trailing edge of the rim, bearing on the rim reinforcements 10. These external stops 13 reinforce in particular the attachment of the spokes to the rim 2 to carry the compression loads on the spokes, while the internal stops 11, for their part, reinforce the rim-spike connection to carry the tension loads of the spokes 4 on the rim 2.

To facilitate perfect manufacturing quality of the wheel 1 of the invention, as well as a high degree of repairability for it, each component (rim 2, hub 3, spokes 4) of said wheel 1 is manufactured individually. Once manufactured, said components are then assembled together to make the wheel 1. This assembly is preferably carried out manually on a suitable assembly jig, by adhesive bonding the spokes 4 into the rim 2 and onto the hub 3. This assembly method was designed to be as simple as possible in terms of number of operations and ease of implementation. The use of metal parts is avoided as much as possible.

The method proceeds in the following manner:
a) installation of a rim 2 and of a wheel hub 3 made of a composite material onto a jig,
b) insertion of the ends of spokes 4 consisting of a composite material, paired two by two, into recesses 8 made for this purpose in the hub and the rim, forming two umbrella-like arrays of spokes,
c) injection of a thermosetting binder into the insertion recesses for the ends of the spokes, and
d) connection of the spokes to the rim and to the hub by polymerization in an autoclave.

The wheel manufacturing method of the invention makes it possible to obtain a pair of wheels 1 with a total mass on the order of 1000 g, for rims 2 with a height of 45 mm. This represents an average gain of 250 g over the pair of wheels compared with wheels equipped with identical rims spoked with stainless steel spokes.

In addition, but still compared to wheels equipped with identical rims and hubs but spoked with metal spokes, the gain in lateral stiffness obtained with the wheels 1 of the invention is at least 25% and the improvement in rotational inertia at least 8%.

The invention claimed is:

1. Wheel (1), for a cycle, including a circular rim (2), a hub (3) concentric with the rim, and spokes (4) connecting said hub (3) to said rim (2), said spokes being made of a polymerized composite material, characterized in that the spokes (4) are paired two by two on either side of the median plane of the wheel and are bonded without tension at their ends onto the hub (3) and onto the rim (2), said spokes being bonded together at their end that is inside the rim.

2. The wheel according to claim 1, characterized in that the spokes (4) exhibit variable thickness over their entire length between the hub and the rim.

3. A wheel according to claim 1, characterized in that the spokes exhibit a longitudinal section that is substantially conical or frusto-conical over their entire length between the hub and the rim.

4. A wheel according to claim 1, characterized in that the spokes are adhesive bonded by a thermosetting resin at their ends ($4_1$, $4_2$) onto the hub and into the rim in recesses provided for this purpose.

5. A wheel according to claim 1, characterized in that it includes stops for blocking the spokes upon insertion into the rim.

6. The wheel according to claim 5, characterized in that it includes stops (11, 13) internal and external to the rim for blocking the spokes within the rim.

7. A wheel according to claim 5, characterized in that the blocking stops are made of composite material.

8. A wheel according to claim 1, characterized in that the rim includes, in the spoke insertion areas (9), a thickness reinforcement (10).

9. A wheel according to claim 1, characterized in that the spokes have a bent end ($4_2$) for insertion into the rim.

10. A wheel according to claim 1, characterized in that the paired spokes (4) are bonded two by two at their ends ($4_2$) inside the rim (2) by a thermosetting resin.

11. A wheel according to claim 1, characterized in that the spokes (4) are attached and oriented at the hub (3) end onto flanges (5, 6) bonded to the hub, along directions radial to the wheel, perpendicular to the hub axis.

12. A wheel according to claim 1, characterized in that at least certain spokes (4) are attached and oriented on a said hub flange (6) along a direction tangent to said hub flange.

13. A wheel according to claim 1, characterized in that the spokes, the rim and the hub of the wheel are made of composite material including carbon fibers impregnated with a thermosetting binder.

14. Method for manufacturing a wheel (1) conforming to claim 1, said wheel including the rim, the hub and the spokes manufactured independently of one another, the method comprising the following steps:
a) installation of a wheel rim (2) and hub (3) made of composite material onto a jig, b) insertion of the ends of spokes (4) made of a composite material, paired two by two, into recesses made for this purpose in the hub and the rim, constituting two umbrella arrays of spokes, c) injection of a thermosetting binder into the recesses for insertion of the ends of the spokes, and d) connection of the spokes to the rim and to the hub by polymerization in an autoclave.

15. A wheel according to claim 1, wherein the rim includes an opening or recess having a dimension to allow an insertion of the ends of the paired spokes as well as an injection, after placement of the spokes, of resin plugs for bonding of ends of the spokes inside the rim and of said spokes to the rim itself.

\* \* \* \* \*